(12) United States Patent
Ostojic et al.

(10) Patent No.: US 8,544,448 B2
(45) Date of Patent: Oct. 1, 2013

(54) METHOD FOR OPERATING AN INTERNAL COMBUSTION ENGINE

(75) Inventors: Predag Ostojic, Bietigheim (DE); Andreas Paa, Winnenden (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 738 days.

(21) Appl. No.: 12/829,412

(22) Filed: Jul. 2, 2010

(65) Prior Publication Data
US 2011/0000462 A1 Jan. 6, 2011

(30) Foreign Application Priority Data
Jul. 4, 2009 (DE) .......................... 10 2009 031 693

(51) Int. Cl.
*F02D 43/00* (2006.01)
*F02P 5/00* (2006.01)
*F02B 63/00* (2006.01)
*F02D 41/14* (2006.01)

(52) U.S. Cl.
USPC .................................................. 123/406.23

(58) Field of Classification Search
USPC ............ 123/406.23, 406.12, 406.45, 406.47, 123/406.24, 674, 694; 701/103–105
See application file for complete search history.

(56) References Cited

U.S. PATENT DOCUMENTS

| 4,706,628 | A | 11/1987 | Trombley |
| 5,345,912 | A | 9/1994 | Svensson et al. |
| 7,117,862 | B2 * | 10/2006 | May .............................. 123/674 |
| 7,845,333 | B2 * | 12/2010 | Sugimoto ................ 123/406.47 |
| 2008/0041338 | A1 | 2/2008 | Nickel et al. |

* cited by examiner

Primary Examiner — Hieu T Vo
(74) Attorney, Agent, or Firm — Gudrun E. Huckett

(57) ABSTRACT

For operating an internal combustion engine with a combustion chamber delimited by a piston driving a crankshaft in a crankcase, with a device for supplying fuel, an ignition device, and an electronic control unit, wherein a correlation between a power output of the internal combustion engine and a lambda value in the combustion chamber is defined by a power output curve that has a first ascending branch, a maximum, and a second descending branch where the lambda value is smaller than 1, the position of an operating point of the internal combustion engine is determined by adjusting the ignition timing to an adjusted ignition timing and evaluating the engine speed reaction caused by the adjusted ignition timing. The supplied fuel quantity is changed as a function of the determined position of the operating point when the determined position of the operating point is not a desired operating point.

18 Claims, 4 Drawing Sheets

METHOD FOR OPERATING AN INTERNAL COMBUSTION ENGINE

BACKGROUND OF THE INVENTION

The invention relates to a method for operating an internal combustion engine.

For operating internal combustion engines, the ratio of fuel and air must be controlled such that the mixture in the combustion chamber can be safely ignited. In internal combustion engines of motor vehicles usually a lambda probe is arranged in the exhaust gas stream. In small internal combustion engines of a simple configuration as they are used, for example, in hand-held power tools such as motor chainsaws, trimmers, lawnmowers or the like a lambda probe is usually not provided. The control of the mixture composition is realized in these engines in that a disruption in the form of a change of the supplied fuel quantity is introduced and the resulting engine speed reaction of the engine is evaluated. Depending on the operating point of the internal combustion engine, after a brief reduction or increase of the injected fuel quantity an increase of the engine speed or a drop of the engine speed occurs. This engine speed reaction can be detected and based thereon the operating point of the internal combustion engine can be derived. Based on the determined operating point, the desired operating point can then be adjusted.

The change of engine speed is very slow, in particular when introducing fuel into the intake passage or into the crankcase of a two-stroke engine. Therefore, it takes a few revolutions of the crankshaft until an engine speed reaction can be determined. When the mixture in the combustion chamber is very lean and the supplied fuel quantity is further reduced for determining the operating point, this can lead to the engine stalling. In case of very lean mixtures there is moreover the risk of motor damage especially as a result of unsatisfactory lubrication.

SUMMARY OF THE INVENTION

It is an object of the present invention to provide a method for operating an internal combustion engine with which a desired operating point can be adjusted well.

In accordance with the present invention, this is achieved by a method for operating an internal combustion engine that has a combustion chamber that is delimited by a piston that drives a crankshaft rotatably supported in a crankcase, wherein the internal combustion engine has a device for supplying fuel, an ignition device, and an electronic control unit, wherein the relation between the power output of the internal combustion engine and the lambda value in the combustion chamber is defined by means of a power output curve that has a first ascending branch, a maximum, and a second descending branch where the lambda value is smaller than 1, wherein the method comprises the following steps:

determining the position of the operating point of the internal combustion engine wherein for determining the position of the operating point the ignition timing is changed and the engine speed reaction of the internal combustion engine for the changed ignition timing is evaluated;

changing the supplied fuel quantity as a function of the determined operating point when the determined operating point is not the desired operating point.

It is provided that for determining the position of the operating state the ignition timing is changed. The adjustment of the ignition timing directly and immediately affects the engine speed of the internal combustion engine so that no delay results. An adjustment of the ignition timing to an advanced ignition timing leads to increased engine power output and thus also to an increased engine speed when the mixture is rich, i.e., the lambda value $\lambda$ is smaller than 1. When the mixture is lean, i.e., the lambda value is greater than 1, the power output drops and thus also the engine speed. The maximum of the power output curve—depending on the internal combustion engine—can be at a lambda value that is somewhat smaller than 1.

Advantageously, the ignition timing is advanced (changed to advanced ignition timing). This means that the motor, when operated in the rich range, i.e., in the range of the second descending branch, has a power output increase and thus also an engine speed increase. Advantageously, the ignition timing is continuously adjusted. In this connection, it can be particularly provided that the change of the ignition timing is realized across a predetermined time period that encompasses several revolutions of the crankshaft. In this way, an operating point adjacent to the maximum of the power output curve can be detected also where the engine speed upon change of the ignition timing first changes in one direction and, after surpassing the maximum, in the other direction.

Advantageously, the supplied fuel quantity is increased when it is determined that the operating point of the internal combustion engine is positioned on the first branch i.e., the engine is operated in the lean range. The supplied fuel quantity is in particular reduced when it is detected that the operating point of the internal combustion engine is positioned on the second branch. It can be provided that the desired operating point is located in the area of the maximum of the power output curve. However, it can also be provided that the internal combustion engine is operated in the range of the second branch, i.e., at a power output below the maximum, within the rich range.

By changing the ignition timing, the engine speed of the internal combustion engine changes. This can be detected by the user and can be interpreted as a malfunction. It is therefore desirable to compensate the engine speed change so that it cannot. detected by the user. For this purpose, it is provided that, in addition to the ignition timing, also the supplied fuel quantity is changed when determining the position of the operating point. The change of the supplied fuel quantity results also in a change of the engine speed that may compensate the change of the engine speed caused by the adjustment of the ignition timing. The change of the supplied fuel quantity is selected advantageously such that no change of the engine speed of the internal combustion engine results when the operating point corresponds to the desired operating point. How large the change of the supplied fuel quantity must be in this connection is different for each individual internal combustion engine and is determined advantageously experimentally and is stored in the electronic control unit of the internal combustion engine. Only when the operating point of the internal combustion engine does not correspond to the desired operating point, a change of the engine speed will result.

The internal combustion engine may drive, for example, the tool of a hand-held power tool. The tool and additional moving parts generate in operation forces caused by mass inertia and these inertia forces affect the engine speed that is produced by the engine. When an engine speed is evaluated by the electronic control unit, the evaluation must be tuned to the inertia forces of the system i.e., to the tool and the like. Since in accordance with the novel method according to the invention an engine speed change is not to occur anymore, the proposed method according to the invention is to a large extent independent of the inertia forces of the system and can thus be used universally.

It can also be provided that the adjustment of the ignition timing is carried out in a controlled fashion. In this connection, the ignition timing is controlled such that substantially no change of the engine speed of the internal combustion engine will result, i.e., an engine speed change of less than 100 rpm occurs. Such an engine speed change is within the normal engine speed fluctuations that occur system-inherently during operation of the internal combustion engine. With the provided change of the supplied fuel quantity, a required change of the ignition timing occurs in order to compensate a theoretical engine speed change caused by the change of the supplied fuel quantity. The change of the ignition timing serves as a control parameter.

When the internal combustion engine is operated at the desired operating point, the required ignition timing change for keeping constant the engine speed is thus known. When the required change of the ignition timing for keeping the engine speed constant deviates from this known value, the internal combustion engine is not operated at the desired operating point. Based on the change of the ignition timing required for keeping constant the engine speed, the actual operating point can thus be determined.

Advantageously, the supplied fuel quantity is reduced and the ignition timing is retarded (set to retarded ignition timing). It may however also be provided that the supplied fuel quantity is increased and the ignition timing is set to advanced ignition timing. In particular in case of two-stroke engines in which the fuel is supplied into the intake passage or into the crankcase, the changed fuel quantity reaches the combustion chamber only after the crankshaft has performed several revolutions and therefore a change of the engine speed is caused only after several revolutions of the crankshaft after the supplied fuel quantity has changed. It is therefore provided that first the supplied fuel quantity is changed and only after a predetermined number of revolutions of the crankshaft have occurred the ignition timing is changed. The predetermined number of revolutions of the crankshaft corresponds to the time that is needed by the fuel to reach the combustion chamber. This time is also advantageously experimentally determined and stored in the electronic control unit. In case of fuel supply into a transfer passage but also in case of supply of fuel into the crankcase, the fuel may reach the combustion chamber so as to be precisely matched to the engine cycle or with a very minimal delay; a change of the supplied fuel quantity therefore immediately causes a change of engine speed and, therefore, a change of the ignition timing is realized simultaneously with the change of the supplied fuel quantity.

The method is in particular carried out at full load of the internal combustion engine. Advantageously, the fuel is supplied by means of a metering valve. In this way, the supplied fuel quantity can be changed simply and also precisely metered. The fuel can be supplied through a carburetor but it can also be provided that the fuel is supplied directly into the crankcase. Also, a fuel valve that supplies fuel into the intake passage and/or into a transfer passage can be expedient.

Embodiments of the invention will be explained in the following with the aid of the drawings.

DESCRIPTION OF THE PREFERRED EMBODIMENTS

Figure 1:
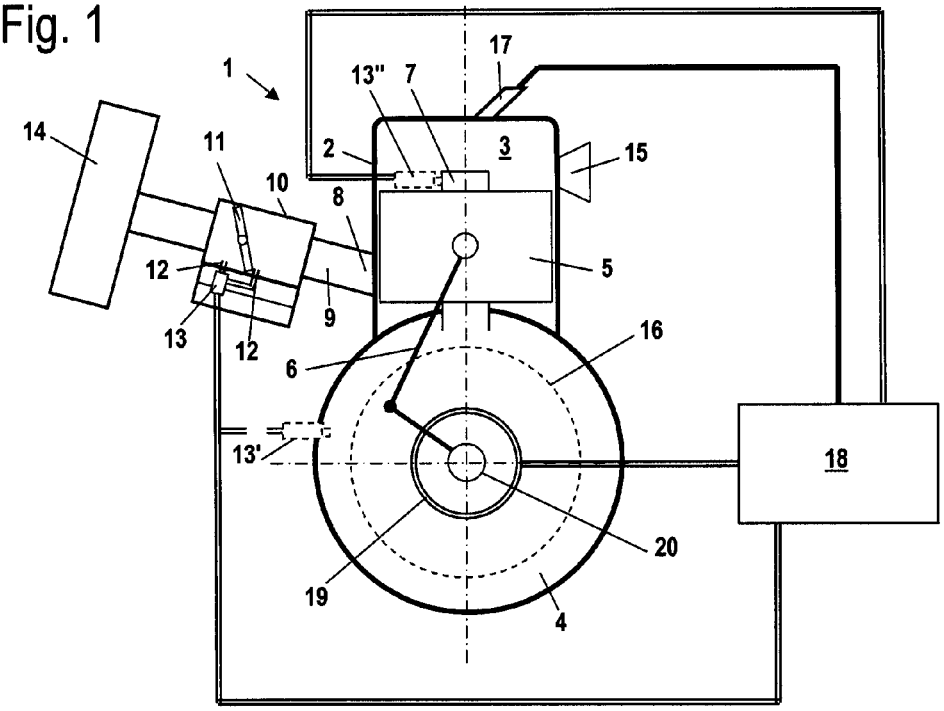
FIG. 1 is a schematic illustration of an internal combustion engine.

FIG. 1 illustrates schematically an internal combustion engine 1 that is embodied as a single-cylinder two-stroke engine. The internal combustion engine 1 is advantageously the drive motor for a hand-held power tool such as a motor chainsaw, a cut-off machine, a trimmer, a lawnmower or the like. The internal combustion engine 1 comprises a cylinder 2 in which an internal combustion chamber 3 is provided. The combustion chamber 3 is delimited by a piston 5 that is reciprocatingly supported in a cylinder 2 and that drives by means of a connecting rod 6 a crankshaft 20 supported rotatably in the crankcase 4. For the supply of combustion air the internal combustion engine 1 is provided with an intake passage 9 that opens with inlet 8 at the cylinder 2 into the crankcase 4. The inlet 8 is piston-controlled by piston 5. In the intake passage 9 a carburetor 10 is arranged in which a throttle 11 is pivotably supported. The intake passage 10 is connected to an air filter 14 through which the combustion air is sucked in. Several fuel openings 12 open in the carburetor 10 and fuel is supplied to these openings 12 by metering valve 13. The metering valve 13 is controlled by electronic control unit 18 that determines the supplied fuel quantity. The metering valve 13 can be, for example, a solenoid (electromagnetic) valve.

Upon upward stroke of the piston 5, combustion air and fuel are sucked into the crankcase 4 and pass into the combustion chamber 3 upon downward stroke of the piston 5 through at least one transfer passage 7 that connects the crankcase 4 in the area of the bottom dead center of the piston 5 to the combustion chamber 3. A spark plug 17 projects into the combustion chamber 3 and is also controlled by the electronic control unit 18 and is also supplied with energy by means of the electronic control unit 18. At the crankcase 20 a generator 19 is arranged that is also connected to the electronic control unit 18 and that supplies the energy for the ignition and supplies a rotary speed (engine speed) signal. Instead, a conventional ignition coil can be employed also. An ignition device is formed by the generator 19 and the spark plug 17 together with the part of the electronic control unit 18 that controls the ignition. In the area of the top dead center of the piston 5 the fuel/air mixture is ignited in the combustion chamber 3. The piston 5 is accelerated thereby in the direction toward the crankcase 4. An outlet 15 extends away from the combustion chamber 3 and through it the exhaust gases of the combustion chamber 3 exit from in the combustion chamber 3. A fan wheel 16 that serves for supplying cooling air to the internal combustion engine 1 is also arranged on the crankcase 20.

In place of the metering valve 13 on the carburetor 10, it is also possible to provide a metering valve 13' that supplies the fuel directly to the crankcase 4. It is also possible to provide a metering valve 13" that supplies the fuel into a transfer passage 7. It is also possible to provide a metering valve that supplies the fuel directly into the combustion chamber 3.

Figure 2:
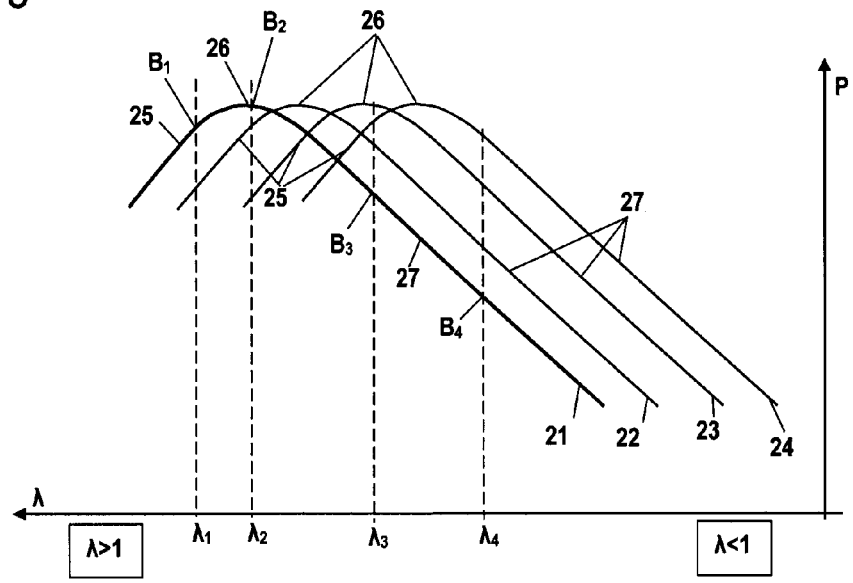
FIG. 2 shows the power output curve that defines the correlation between power output and lambda value for different ignition timings.

In operation of the internal combustion engine 1 the electronic control unit 18 controls the quantity of fuel supplied by means of metering valve 13 and the ignition timing of the spark plug 17 for igniting the mixture. Two-stroke engines are usually operated within the rich range which means that the lambda value $\lambda$ that indicates the ratio of air mass that is actually available for combustion to the minimum required stoichiometric air mass is smaller than 1, for example, approximately 0.85. This also holds true for spark-ignited four-stroke engines. For controlling the supplied fuel quantity, in engines in which no lambda probe is available the power output curve that is illustrated in FIG. 2 can be utilized. The power output curve indicates the correlation of engine power output P and lambda value $\lambda$. In the illustration in FIG. 2, lambda values that are greater than 1, indicating a lean mixture, are shown to the left and lambda values smaller than 1 indicating a rich mixture, are shown to the right. As shown by the performance curve 21, the power output P upon enriching the mixture from the lean range increases first along a first ascending branch 25 to the maximum 26. Upon further enrichment, the power output P drops in accordance with the second branch 27. The additional power output curves 22, 23 and 24 indicated in FIG. 2 show the same course of the power output P at different ignition timing. From the power output curve 21 to the power output curve 24 across the power output curves 22 and 23 the ignition timing ZZP is set to advanced ignition timing.

In FIG. 2 in an exemplary fashion four operating points $B_1$, $B_2$, $B_3$, $B_4$ are shown on the power output curve 21 that have different lambda values $\lambda_1$, $\lambda_2$, $\lambda_3$, $\lambda_4$ correlated therewith.

Depending on the internal combustion engine 1, a desired operating point may be, for example, the operating point $B_2$ at the maximum 26 or the operating point $B_3$ on the second branch 27. Also, other desired operating points that are on the second branch 27 may be provided. In contrast to this, operation on the first branch 25 is usually undesirable because leaning in this range leads quickly to stalling of the engine; moreover, in case of very lean mixtures often no satisfactory cooling and/or lubrication of the internal combustion engine 1 can be achieved. In order to be able to adjust the desired operating point, the momentary operating point must be determined. In this connection, it must particularly determined whether the operating point is on the first branch 25 or on the second branch 27 because for achieving a desired power output P or a desired engine speed n in one case the mixture must be enriched and in the other case it must be made lean.

In order to determine on which branch 25, 27 the momentary operating point is positioned, it is provided to change the ignition timing ZZP. When the current operating point is on the first branch 25 or at the maximum 26 as indicated in an exemplary fashion by operating points $B_1$ and $B_2$, an adjustment of the ignition timing ZZP to an advanced ignition timing has the result that the power output P and thus also the engine speed n of the internal combustion engine 1 will drop, namely to the values defined at lambda value $\lambda_1$ and $\lambda_2$, respectively, upon adjustment of the ignition timing ZZP from the ignition timing of the power output curve 21 to the ignition timing of the power output curve 22. Since the adjustment of the ignition timing is done very quickly, it is assumed that the operating conditions remain constant, i.e., the power output P is proportional to the engine speed n of the internal combustion engine. Upon adjustment of the ignition timing to advanced ignition timing therefore in accordance with the power drop an engine speed drop results when the internal combustion engine 1 is operated at the operating point $B_1$ or the operating point $B_2$.

At the operating point $B_3$ that in the embodiment is the desired operating point, the power output upon adjustment of the ignition timing ZZP to advanced ignition timing first increases as defined by the power output curves 22 and 23. Subsequently, the power output P drops and thus also the engine speed n to the value that is defined by the first branch 25 of the power output curve 24 at the lambda value $\lambda_3$. On the other hand, at the operating point $B_4$ o the adjustment of the ignition timing ZZP to advanced ignition timing causes a power output increase and thus also an increase of the engine speed n as is defined by the power output curves 22 to 24 at the lambda value $\lambda_4$. Based on whether the engine speed n drops, increases, or initially increases and then drops, it is therefore possible to determine the operating point of the internal combustion engine 1.

Figure 3:
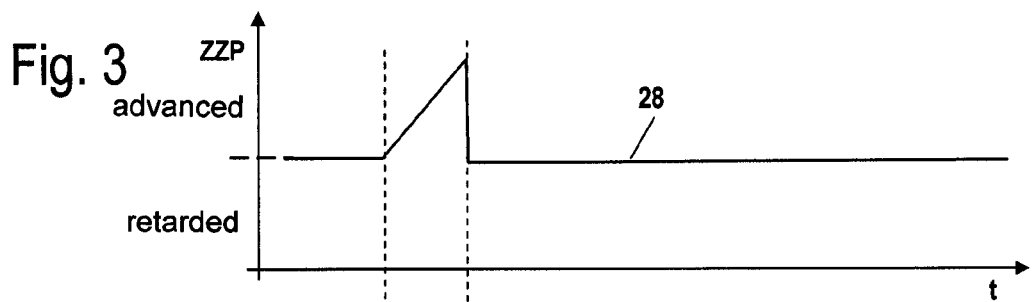
FIG. 3 is an exemplary course of the ignition timing.
Figure 4:
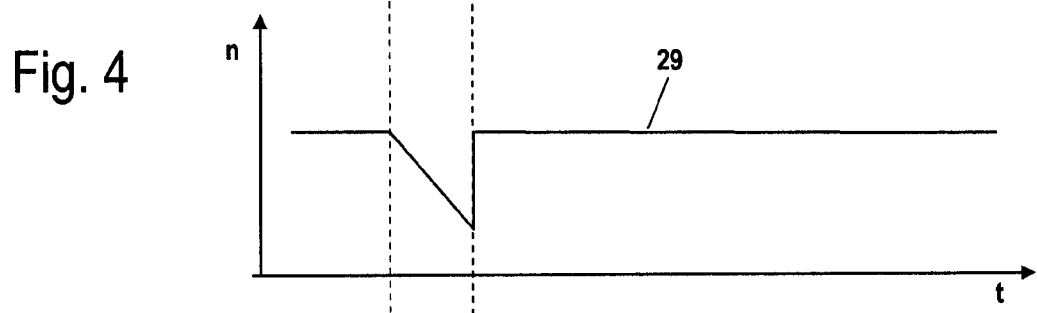
FIG. 4 is a first possible engine speed course over time for the ignition timing course of FIG. 3.
Figure 5:
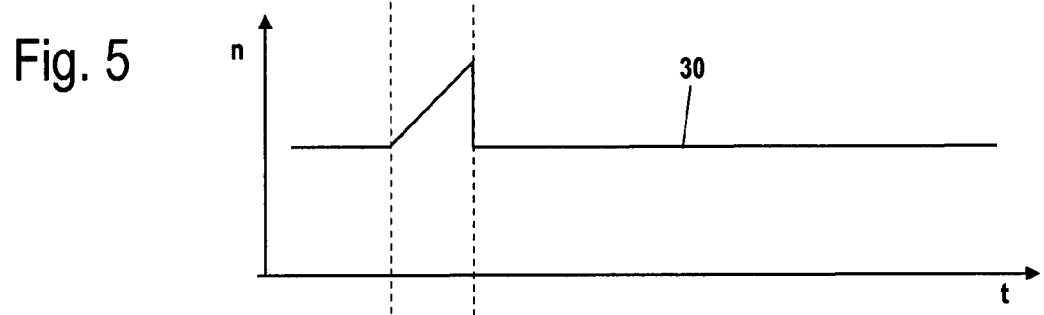
FIG. 5 is a second possible engine speed course over time for the ignition timing course of FIG. 3.
Figure 6:
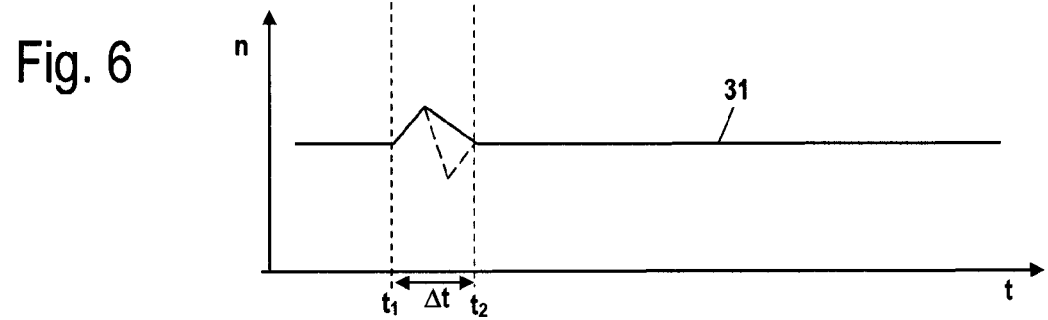
FIG. 6 is a third possible engine speed course over time for the ignition timing course of FIG. 3.

The various engine speed reactions are shown in FIGS. 4 to 6 for a course of the ignition timing ZZP as shown in FIG. 3. FIG. 3 shows an ignition timing curve 28 that indicates the course of the ignition timing ZZP over time t and also where the ignition timing ZZP for a time period $\Delta t$ from the point $t_1$ to the point $t_2$ is adjusted to advanced ignition timing. When the combustion engine 1 is operated at the operating point $B_1$ or at the operating point $B_2$ the engine speed n will drop in accordance with the engine speed curve 29 in FIG. 4. Upon operation of the internal combustion engine 1 at the operating point $B_4$ the engine speed n will however increase continuously in accordance with the engine speed curve 30 in FIG. 5. When the internal combustion engine 1 is operated at the operating point $B_3$ the engine speed n will initially increase in accordance with the engine speed curve 31 in FIG. 6 and then will drop again. Advantageously, the engine speed n does not drop below the initial value that is indicated by the solid line. However, a drop of the engine speed n below the initial value may result. This is indicated in FIG. 6 by the curve shown in dashed lines.

Figure 14:
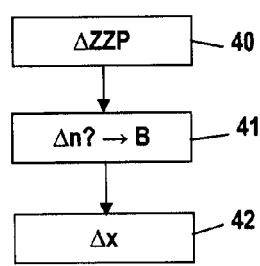
FIG. 14 shows a flow chart illustrating a first embodiment of the method of the present invention.

FIG. 14 shows the sequence of the method steps of the method according to the invention. In the method step 40 the ignition timing ZZP is continuously changed. A sudden change of the ignition timing ZZP is possible also. In method step 41 the engine speed reaction that is illustrated in FIGS. 4 through 6, i.e. the course of the engine speed n over the time t is measured and evaluated. The course of the engine speed, for example, can be derived from the signal of the generator 19 by the electronic control unit 18. Based on the measured engine speed course the operating point B is determined. As a function of the determined operating point, in the method step 42 the supplied fuel quantity x is changed when the detected operating point deviates from the desired operating point. In this connection, the supplied fuel quantity is increased when the determined operating point in the illustration of FIG. 2 is to the left of the desired operating point, i.e., the mixture is too lean, and is made lean when the determined operating point is to the right of the desired operating point in FIG. 2, i.e. the mixture is too rich.

By adjusting the ignition timing ZZP, a change of the engine speed n results that is recognized by the operator and is perceived as disturbing. The operator will not recognize an engine speed change Δn when it is below 100 rpm because such engine speed changes occur system-inherently in normal operation of the internal combustion engine. In order to achieve such a minimal engine speed fluctuation, it is provided to compensate an expected change of the engine speed n in that the supplied fuel quantity x when determining the operating point is changed appropriately. This is illustrated in FIGS. 7 through 10. FIG. 8 shows the proposed theoretical sudden adjustment of the ignition timing ZZP to retarded ignition timing in the form of the ignition timing curve 33. In this embodiment the desired operating point is at the operating point $B_3$ in FIG. 2. Upon adjustment of the ignition timing ZZP to retarded ignition timing it is therefore to be expected that the engine speed n will drop, for example, when the ignition timing ZZP is changed from that of the power output curve 23 to the ignition timing ZZP correlated with the power output curve 21.

Figure 7:
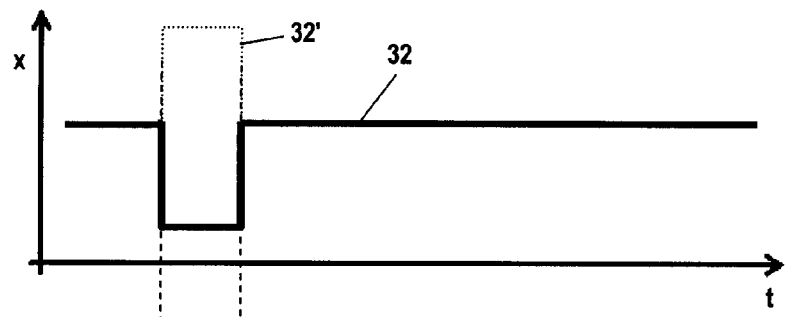
FIG. 7 shows a possible course of the supplied fuel quantity.
Figure 8:
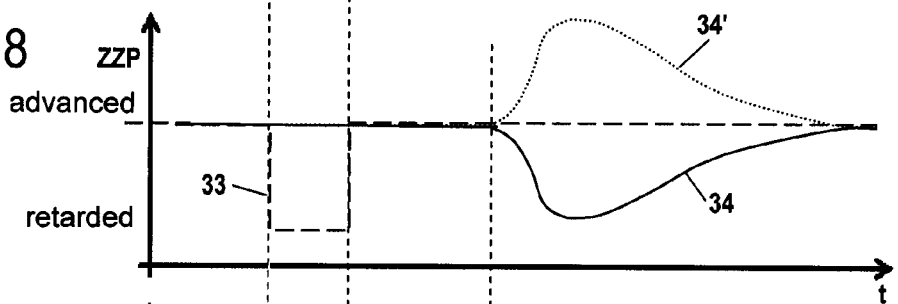
FIG. 8 shows the course of the ignition timing for the purpose of compensation of the engine speed change caused by the course of the supplied fuel quantity of FIG. 7.

In order to compensate the expected engine speed drop, it is provided to change the supplied fuel quantity x as indicated in FIG. 7 by curve 32. The reduction of the fuel quantity x is also to be done suddenly. The reduced fuel quantity is supplied from the point in time $t_1$ to the point in time $t_2$. Upon change of the supplied fuel quantity x by means of a change in control of the metering valve 13 it will take several revolutions of the crankshaft 20 until actually a leaned mixture will reach the combustion chamber 3. The adjustment of the ignition timing ZZP has however an immediate effect on the engine speed n. In order to achieve that the engine speed changes as a result of a change in supplied fuel quantity x and the adjustment of the ignition timing ZZP take effect simultaneously, for a change of the ignition timing the actual delayed course indicated by curve 34 in FIG. 8 is therefore provided. The ignition timing ZZP is adjusted at a point in time $t_3$ that is later than the point in time $t_2$. The actual adjustment of the ignition timing ZZP is not realized suddenly but gradually based on a curve. In case of a supply of fuel by the metering valve 13' into the crankcase or in case of fuel supplied directly into a transfer passage, a change of the supplied fuel quantity x can also have an effect without delay so that the change of the ignition timing ZZP can be realized also without delay and suddenly.

Figure 9:
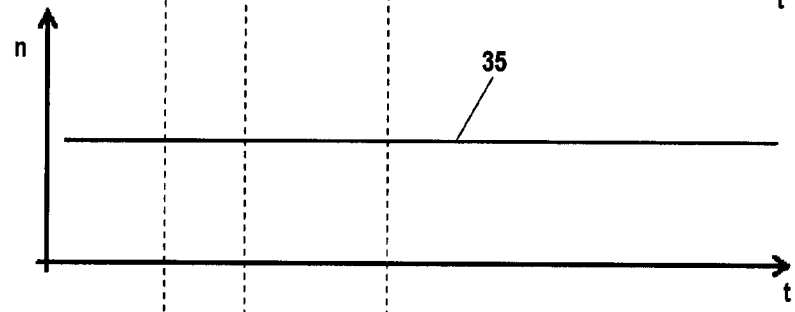
FIG. 9 shows a first possible engine speed course over time.
Figure 10:
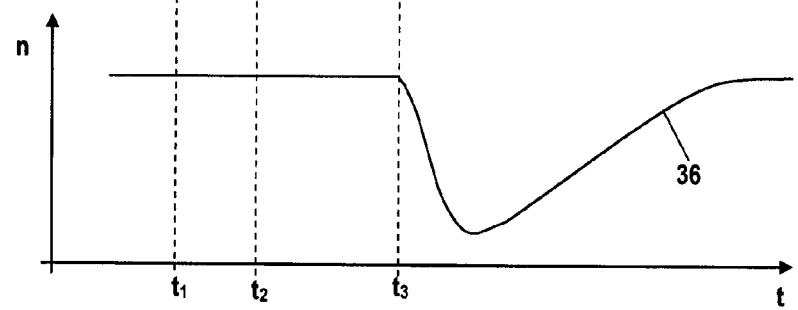
FIG. 10 shows a second possible engine speed course over time.

When the operating point of the engine is at the operating point $B_3$, as indicated in FIG. 9 by the engine speed curve 35, no change of the engine speed will be observed. In this way, it can be determined in a simple way and without engine speed effect whether the internal combustion engine 1 is operating at the operating point $B_3$. When the operating point of the engine is however on the first branch 25, the adjustment of the ignition timing according to the ignition timing curve 34 of FIG. 8 to retarded ignition timing causes an increase of the engine speed n. As a result of the simultaneously occurring reduction of the supplied fuel quantity x according to FIG. 7, the engine speed n is very significantly increased, and the engine speed course that is shown by the engine speed curve 36 results.

Instead of a reduction of the fuel quantity x and an adjustment of the ignition timing to retarded ignition timing, it can also be provided that the fuel quantity is increased according to curve 32' shown in FIG. 7 in dashed lines. For compensating the engine speed change caused by the increased fuel quantity x the ignition timing as shown in FIG. 8 is changed to advanced ignition timing according to curve 34.

Instead of adjusting the change of the ignition timing for the desired operating point it can also be provided to change the ignition timing so that no noticeable engine speed change will result. This is illustrated schematically in FIGS. 11 to 13. The supplied fuel quantity x is reduced according to curve 37 from the point in time $t_1$ to the point in time $t_2$. The reduction of the supplied fuel quantity x can be realized in case of supply of fuel by means of a cycled metering valve 13 or 13' by increasing the duty cycle (on-off cycle), i.e., the metering valves 13, 13' as a whole stay closed longer. As a result of the reduced fuel quantity at the point in time $t_3$ a change of the engine speed n occurs. This very small change of the engine speed n is counteracted by the controller in the electronic control unit 18 by appropriate adjustment of the ignition timing ZZP so that the engine speed n remains constant with the exception of minimal engine speed fluctuations that can no longer be detected by the operator. The constant course of the engine speed n is shown in FIG. 13 by curve 38.

Figure 11:
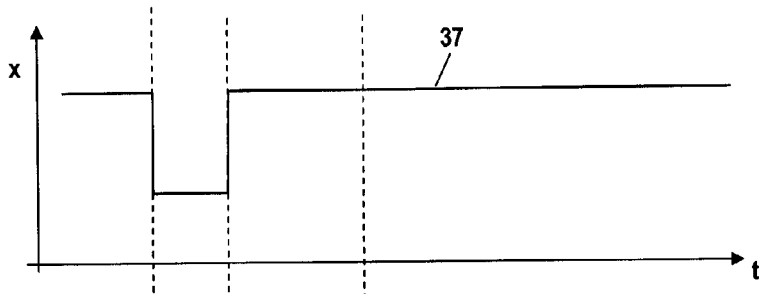
FIG. 11 shows a possible course of the supplied fuel quantity.
Figure 12:
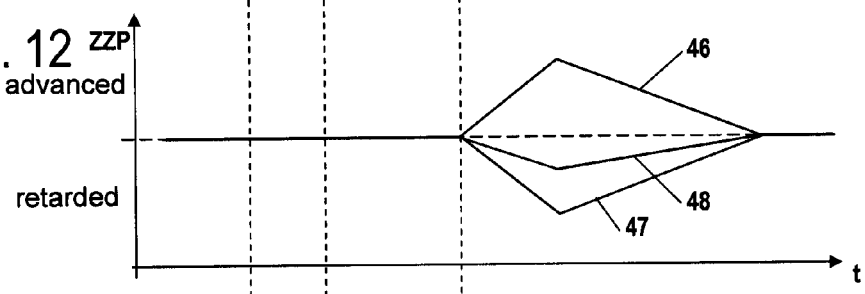
FIG. 12 shows possible courses of the ignition timing for the purpose of compensation of the engine speed change caused by the course of the supplied fuel quantity according to FIG. 11.
Figure 13:
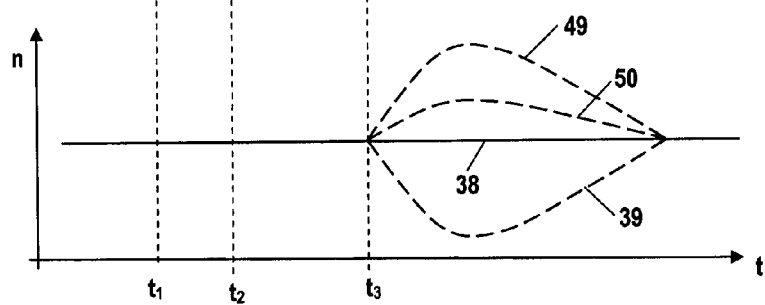
FIG. 13 shows the engine speed course over time.

When the internal combustion engine 1 operates on the ascending branch, for example, at the operating point $B_1$ (FIG. 2), as a result of the reduction of the fuel quantity x indicated in FIG. 11, the engine speed course that is indicated by curve 39 in FIG. 13 would result. The engine speed would drop. This can be compensated by an adjustment of the ignition timing to advanced ignition timing as is schematically indicated by the ignition timing curve 46 in FIG. 12. In FIG. 12, the ignition timing curve 46 has a ramp-shaped course. The ignition timing curve 46 however can also have a rounded curve shape.

When the operating point of the internal combustion engine 1 is located on the second descending branch 27, for example, at the operating point $B_4$, the engine speed increase as indicated in FIG. 13 by the engine speed curve 49 would result without a change of the ignition timing ZZP for reduction of the supplied fuel quantity x. This engine speed increase can be compensated by an adjustment of the ignition timing to a retarded ignition timing as is indicated by the ignition timing curve 47 in FIG. 12. Accordingly, the engine speed increase that is illustrated by the engine speed curve 50 in FIG. 13 is compensated by an ignition timing adjustment to retarded ignition timing in accordance with the ignition timing curve 48.

By controlling the ignition timing adjustment independent of the operating point B of the internal combustion engine 1 it can be achieved that despite the change of the supplied fuel quantity x no fluctuations of the engine speed that are detectable by the operator will result. The ignition timing ZZP is controlled such that the engine speed n remains constant.

Figure 15:
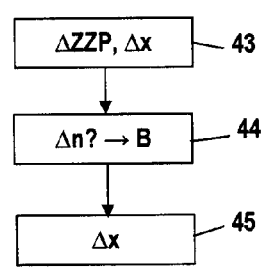
FIG. 15 shows a flow chart illustrating a second embodiment of the method of the present invention.

FIG. 15 shows the sequence of the method steps of the inventive method for controlling the internal combustion engine 1. In the method step 43 the ignition timing ZZP and the supplied fuel quantity x are changed such that the engine speed effect is canceled when the engine is operated at the desired operating point. In this connection, advantageously the ignition timing is retarded and the supplied fuel quantity x is reduced. In the method step 44 it is determined whether the engine speed n changes and, based on the possibly occurring or absent engine speed change, the operating point of the internal combustion engine 1 is determined. When the operating point B is not at the desired operating point, the supplied fuel quantity x is changed in the method step 45 until the operating point of the internal combustion engine is at the desired operating point.

Figure 16:
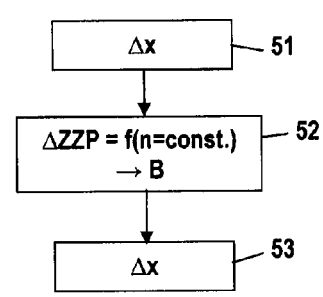
FIG. 16 shows a flow chart illustrating a third embodiment of the method of the present invention.

Instead, the adjustment of the ignition timing ZZP can also be done in a controlled fashion such that no engine speed change will result. This is illustrated in FIG. 16. In the method step 51 the supplied fuel quantity x is changed. In the method step 52 the change ΔZZP of the ignition timing ZZP that results for constant engine speed n will be evaluated. The detection of the operating point of the internal combustion engine 1 is realized based on the course of the ignition timing ZZP. When the operating point is not at the desired operating point, the supplied fuel quantity x is changed in the method step 53 until the operating point of the internal combustion engine is at the desired operating point.

In order to adjust a desired operating point, it may be expedient to first select the maximum 26 of a power output curve 21, 22, 23, 24 as an operating point and, based on the maximum 26, to increase the supplied fuel quantity x by a predetermined value in order to reach a desired operating point B on the second branch 27. However, it can also be provided to determine directly, based on the engine speed reaction or the course of the ignition timing ZZP at constant engine speed n, the location of the momentary operating point and, based on the momentary operating point, to adjust the desired operating point by changing the supplied fuel quantity x.

The specification incorporates by reference the entire disclosure of German priority document 10 2009 031 693.0 having a filing date of Jul. 4, 2009.

While specific embodiments of the invention have been shown and described in detail to illustrate the inventive principles, it will be understood that the invention may be embodied otherwise without departing from such principles.

What is claimed is:

1. A method for operating an internal combustion engine, wherein the internal combustion engine comprises a combustion chamber delimited by a piston, wherein the piston drives a crankshaft rotatably supported in a crankcase of the internal combustion engine, wherein the internal combustion engine comprises a device for supplying fuel, an ignition device, and an electronic control unit, wherein a correlation between a power output of the internal combustion engine and a lambda value in the combustion chamber is defined by a power output curve that has a first ascending branch, a maximum, and a second descending branch where the lambda value is smaller than 1; the method comprising:
   determining a position of an operating point of the internal combustion engine by adjusting an ignition timing of the internal combustion engine to an adjusted ignition timing and evaluating an engine speed reaction of the internal combustion engine caused by the adjusted ignition timing;
   changing a supplied fuel quantity as a function of the determined position of the operating point when the determined position of the operating point is not a desired operating point.

2. The method according to claim 1, wherein in the step of adjusting the ignition timing is advanced.

3. The method according to claim 1, wherein in the step of adjusting the ignition timing is adjusted continuously.

4. The method according to claim 1, wherein in the step of adjusting a change to the adjusted ignition timing is carried out across a predetermined period of time in which period of time the crankshaft performs several revolutions.

5. The method according to claim 1, wherein the step of changing comprises increasing the supplied fuel quantity when the determined position of the operating point of the internal combustion engine is located on the first branch.

6. The method according to claim 1, wherein the step of changing comprises decreasing the supplied fuel quantity when the determined position of the operating point of the internal combustion engine is located on the second branch.

7. The method according to claim 1, wherein the step of determining comprises additionally changing the supplied fuel quantity.

8. The method according to claim 7, wherein a change in the supplied fuel quantity is selected such that no change of an engine speed of the internal combustion engine results when the determined position of the operating point corresponds to the desired operating point.

9. The method according to claim 7, wherein the step of adjusting the ignition timing is performed in a controlled fashion such that the ignition timing is controlled such that approximately no change of an engine speed of the internal combustion engine results.

10. The method according to claim 7, wherein the supplied fuel quantity is reduced and the ignition timing is retarded.

11. The method according to claim 7, wherein the supplied fuel quantity is increased and the ignition timing is advanced.

12. The method according to claim 7, wherein first the supplied fuel quantity is changed and the ignition timing is changed subsequently after the crankshaft has performed a predetermined number of revolutions.

13. The method according to claim 1, carried out at full load of the internal combustion engine.

14. The method according to claim 1, comprising the step of supplying the fuel by a metering valve.

15. The method according to claim 1, comprising the step of supplying the fuel through a carburetor.

16. The method according to claim 1, comprising the step of supplying the fuel directly into the crankcase.

17. The method according to claim 1, wherein the internal combustion engine comprises an intake passage, the method comprising the step of supplying the fuel into the intake passage.

18. The method according to claim 1, wherein the internal combustion engine comprises at least one transfer passage, the method comprising the step of supplying the fuel into the at least one transfer passage.

* * * * *